3,078,738
MOTION-TO-AIR-PRESSURE TRANSDUCER
William A. Siegel, Philadelphia, Pa., assignor to Minneapolis-Honeywell Regulator Company, Minneapolis, Minn., a corporation of Delaware
Filed Oct. 31, 1960, Ser. No. 66,219
2 Claims. (Cl. 74—579)

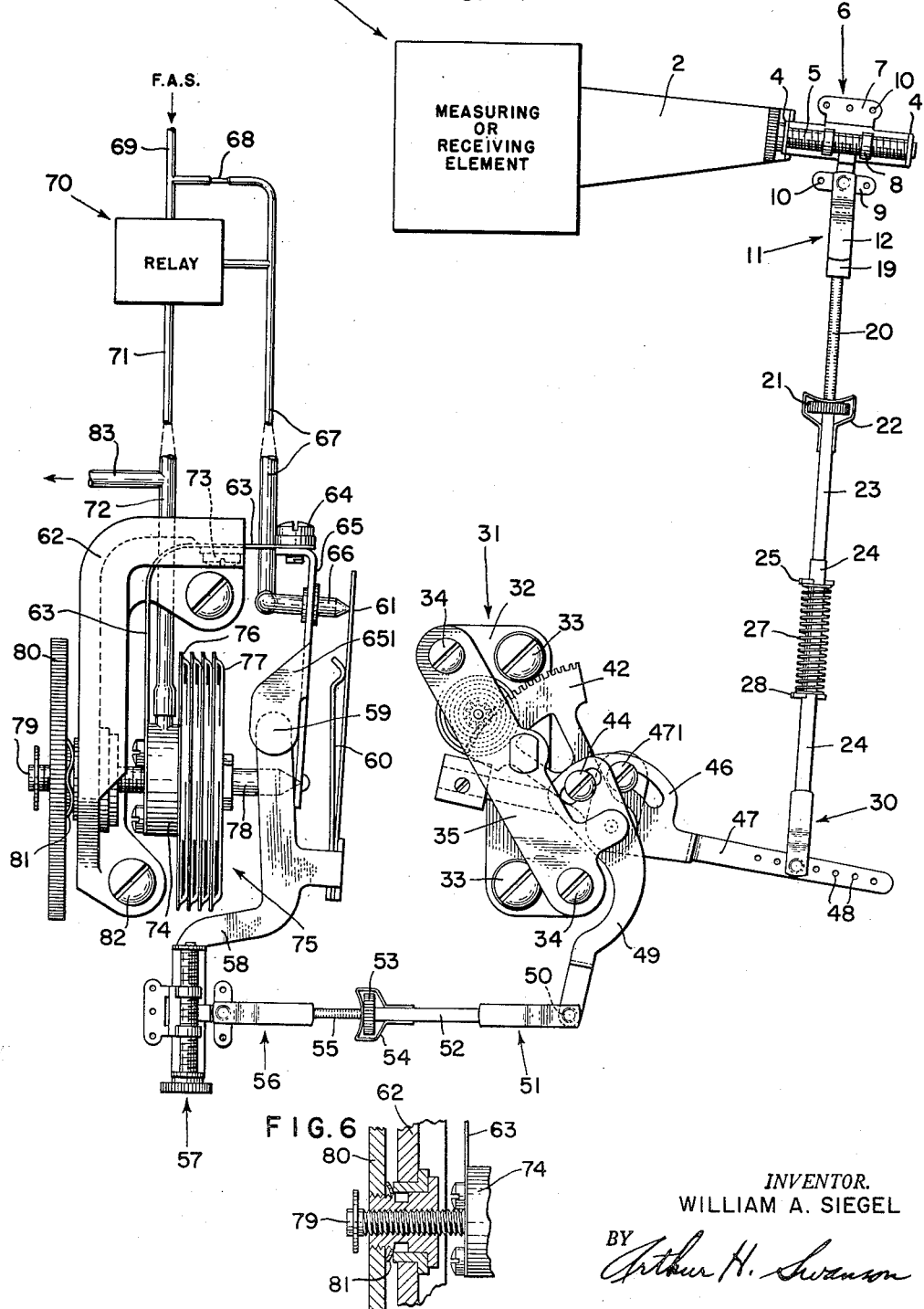

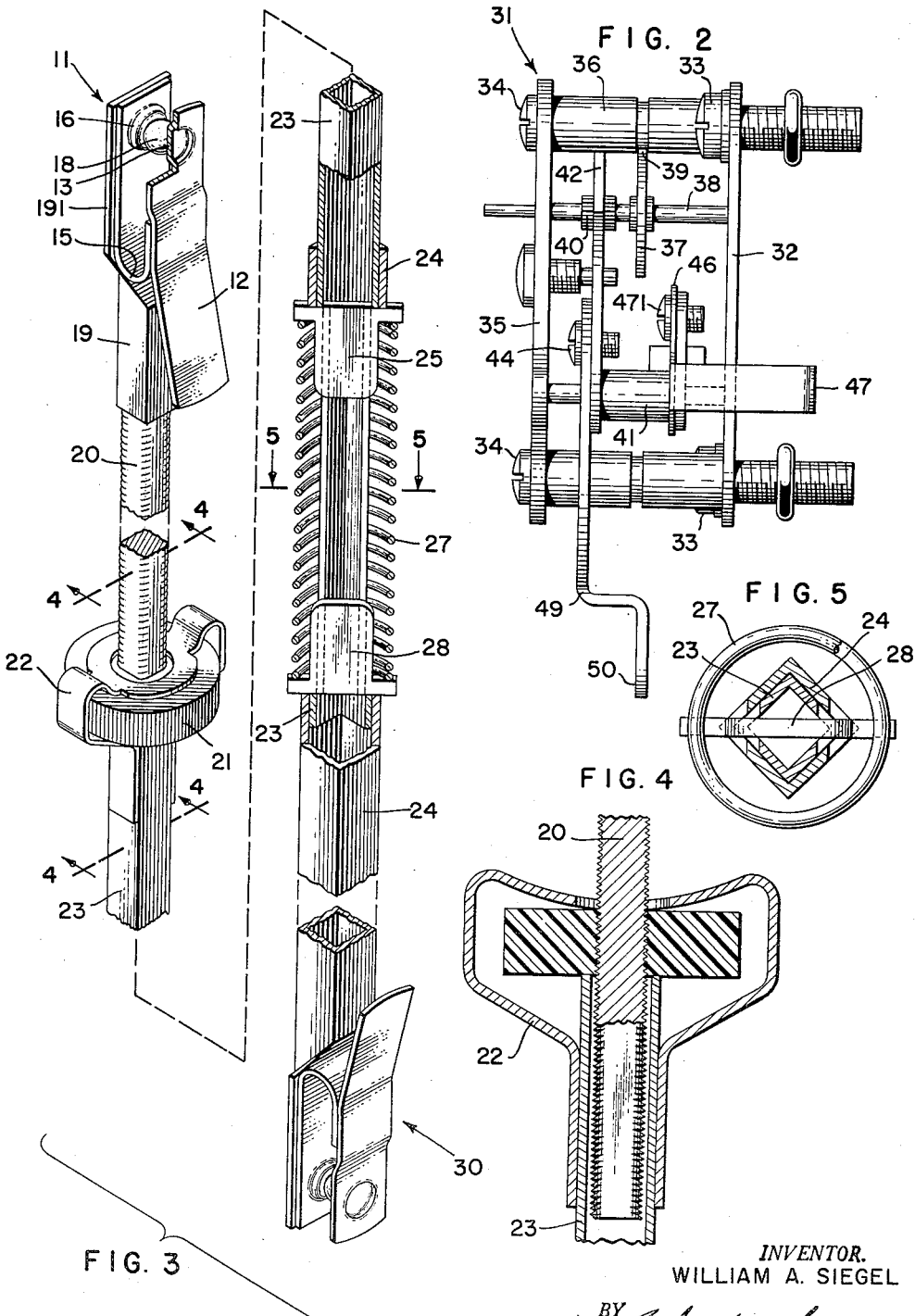

This invention relates to a transducer designed to change an input motion into an output pressure.

It is an object of this invention to provide a motion-to-pressure transducer having a novel, adjustable linkage having a telescoping motion.

It is a further object of this invention to provide a motion-to-pressure transducer having a flapper-nozzle valve and feed-back bellows adapted to change an input motion to an output pressure.

Yet a further object of this invention is to provide means for compensating the feed-back bellows against the effects of changes in ambient temperature. These means comprise a bellows of metallic material, such as stainless steel, which has a thermo-elastic coefficient of approximately zero. This prevents expansion or contraction of the bellows when heated or cooled.

A better understanding of the present invention may be had from the following detailed description when read in connection with the accompanying drawings in which:

FIG. 1 is an elevation with parts shown diagrammatically.

FIG. 2 is a side elevation of the indicating movement 31.

FIG. 3 is an exploded, perspective view with parts in transverse, cross section and parts in longitudinal, cross section.

FIG. 4 is a longitudinal, cross section of a portion of the linkage taken on lines 4—4 of FIG. 3, as viewed in the direction of the arrows.

FIG. 5 is a transverse, cross section taken on line 5—5 of FIG. 3, as viewed in the direction of the arrows.

FIG. 6 is a longitudinal, cross section showing the means for mounting the bellows.

The input element of this transducer is generally indicated 1 and may be one of large number of measuring or receiving elements having an output in the form of a reciprocating or oscillating motion of small extent. Examples of such input elements are Bourdon tubes or spiral helices adapted to be operated by the pressure of a liquid or gas within the tube or helix. Such an input element might also be a diaphragm or bellows adapted to receive the pressure of a gas or liquid transmitted from a distant location. Other examples of such a measuring or receiving element are a mechanical or electric motor having a reciprocating, oscillating or rotating output.

The output element 2 of the input element 1 is shown as a lever adapted to oscillate at its right hand end through an arc of short extent.

On the free or movable end of the lever 2 are a pair of tangs 4 in which is mounted a connector, generally indicated 6, comprising a screw 5 having rotary connection with tangs 4 and with a second pair of tangs 8 connected to a flat plate having end portions 7 and 9 containing holes 10. By rotating the screw 5, connector 6 can be adjusted radially of lever 2.

Connected to the central hole 10 of connector 6 is a clip, generally indicated 11. Clip 11 comprises a thumb piece 12 having at one end thereof a boss 13 having a flat face. Thumb piece 12 is mounted on a generally U-shaped spring 15 having a boss 16 perforated by a hole at one end thereof. A ball 18 is secured to boss 16 by spot welding the ball 18 to the rim of the hole. Piece 12 is biased toward ball 18 and may be operated, by the thumb or otherwise, so as to move boss 13 toward or away from ball 18 and thus secure plate 9 of connector 6 so that ball 18 enters a portion of one of the holes 10.

Clip 11 is secured to a flat portion 191 of a link 19 which may be of square cross-section.

Into the hollow portion of link 19 fits one end of a screw threaded rod 20. One end of the rod 20 fits into the flat walls of the square portion of link 19 and is connected thereto as by spot welding.

Another portion of rod 20 has on it a nut 21. Nut 21 is secured, by means of spring clip 22, to one end of an intermediate link 23 which may be likewise of square cross-section and which has a pair of slots in the opposite walls thereof adjacent to but spaced from the end of the intermediate link 23 opposite to the spring clip 22. Telescoping with the end of intermediate link 23 adjacent to the slots therein is a second link 24 which also has a pair of slots in its opposite walls adjacent to but spaced from the end of the link 24 which telescopes with the link 23. Flat, T-shaped retainers 25 and 28 are located in the telescoping ends of the links 23 and 24 so that the vertical stems of the retainers are within the links 23 and 24 and the heads or cross bars of the retainers extend through the slots in the links 23 and 24 and project therethrough. Between the telescoping ends of the links 23 and 24 and engaged by the projecting heads of the retainers 25 and 28 is a spring 27. Spring 27 presses on retainers 25 and 28 and extends the linkage formed of the links 23 and 24 to its greatest extent by the engagement of retainers 25 and 28 with the ends of the slots in telescoping links 23 and 24. A clip 30, identical with clip 11, is connected to the lower end of link 28.

An indicating movement, generally indicated 31, comprises a base plate 32 adapted to be secured to a support by screws 33. An upper plate 35 is mounted on the ends of pillars 36 and secured thereto by screws 34. A helical hair spring 37 is connected at its center to shaft 38 which is pivoted in plates 32 and 35 and which carries on it a pinion 40. The outer end 39 of hair spring 37 is connected to post 36 so that this end of the hair spring is attached to a stationary support and causes shaft 38 to rotate when moved from its intermediate position.

Pinion 40 has toothed engagement with the teeth on segment 42. Segment 42 is mounted on shaft 41 pivoted in plates 32 and 35. Screw 44 passes through a slot in lever 49 having hole 50 in the outer, movable end thereof and secures segment 42 to lever 49 in a selected, adjustable position.

Also mounted on shaft 41 is a plate 46 having a hole in it into which passes screw 471 located in a slot in lever 47 and connecting plate 46 to lever 47 having a plurality of holes 48 therein. Clip 30 connects to one of the holes 48 in lever 47.

Connected to the hole 50 in the free end of lever 49 is a third clip, generally indicated 51, identical with clip 11. Clip 51 is mounted on one end of a hollow link 52 having a square cross section. A spring clip 54 is mounted on the other end of link 52 and secures a nut 53 mounted on a screw threaded rod 55 to link 52. The other end of rod 55 is spot welded or otherwise secured to a clip, generally indicated 56, identical with clip 11. The ball of clip 56 fits in a hole in a connector, generally indicated 57, identical with connector 6.

Connector 57 is fastened to one end of a lever 58 which is pivoted at 59 in two ears 651 forming parts of a support 65 mounted, by means of screw 64 and a flat plate 63, on a support plate 62 adapted to be mounted on a support by two screws 82.

Support 65 carries a hollow nozzle 66 connected by pipe 67 and restriction 68 with hollow pipe 69 connected to a filtered air supply F.A.S. Nozzle pipe 67 may be directly connected to output pipe 83 or may be connected thereto through a pilot valve or relay, generally indicated 70. Pilot valve or relay 70 is well-known, commercially available article, such as that shown and described in U. S. Patent 2,125,081 issued July 26, 1938 to C. B. Moore.

Nozzle pipe 67 is also connected directly or through relay 70 to feed-back pipe 72. Pipe 72 connects to a hollow block 74. Block 74 connects to the stationary end 76 of a hollow bellows 75 having a movable end 77 on which is supported a pin 78 which bears against support 65 so as to move lever 58 about its pivot 59 and thus move flapper 61 relative to nozzle 66. Spring 60 stresses flapper 61 and allows over-travel of lever 58 when flapper 61 is engaged with nozzle 66.

Bellows 76, 77 is fabricated of a metallic material, such as stainless steel, which has a thermo-elastic coefficient of approximately zero. In consequence of this, the bellows does not expand or contract when subjected to changes in temperature.

One end of rod 79 is secured to block 74 and is screw threadedly mounted in support 62. A disc 80 is fast on screw 79. A corrugated, disc spring 81 biases disc 80 and screw 79 to the left, as seen in the drawing.

Plate 63 prevents block 74 from rotating, so that rotation of disc 80 causes screw 79 to move to the right or to the left and thereby to adjust zero position of the pin 78, and, consequently, of the flapper 61 relative to the nozzle 66.

One output of the transducer is formed by the projecting end of the shaft 38 on which may be mounted a pointer or other mechanism, if the transducer is to be used to control further mechanism.

The other output of the transducer is by means of the pipe 83 through which fluid, at a pressure regulated by the adjustment of nozzle 66 and flapper 61, is led to any suitable fluid-pressure-operated indicator, recorder or controller.

What is claimed is:

1. An adjustable connecting rod assembly comprising: a first, manually operable, U-shaped, spring clip; a thumb piece mounted on one leg of said U and providing means for moving the open ends of the U toward or away from each other; a solid rod connected at one end to said first clip and having screw threads on a portion of its outer surface; a hollow, intermediate link having at least one slot through the wall thereof; a connector clip connected to a portion of said intermediate link adjacent one end thereof; a nut mounted on the screw threads on said rod and located between said intermediate clip and one end of said intermediate link so as to connect said intermediate link to said solid rod; a second, hollow link having at least one slot through the wall thereof and telescoping with said intermediate link; a pair of flat, T-shaped retainers mounted in the telescoping portions of said intermediate link and of said second link and having portions projecting through the slots in said links; a coil spring encircling the telescoping portions of said links and bearing at its ends against the projecting portions of said retainers; and a second, manually operable, U-shaped, spring clip mounted on a portion of said second link spaced from the telescoping portions of said links.

2. An adjustable connecting rod assembly, including: a first, manually operable, U-shaped, spring clip; a ball mounted on the inner portion of said clip adjacent the open end of the U; a thumb piece mounted on the opposite leg of said U and forming means for moving one leg of said U toward or away from said ball; a solid rod having a portion connected to said first clip and having screw threads on a portion of its outer surface; a hollow, intermediate link having at least one slot through the wall thereof; a connecting clip secured to said intermediate link adjacent one end thereof; a nut mounted on the screw threads on said solid rod and located between said spring clip and one end of said intermediate link so as to connect said rod and said link together; a second, hollow link having a slot through at least one wall thereof and having a portion telescoping with a portion of said intermediate link; a pair of flat, T-shaped retainers having stems mounted on the telescoping portion of said links having portions projecting through the slots in said links; a helical, coil spring surrounding the telescoping portion of said links and bearing at its ends against the projecting portions of said retainers; and a second, manually operable, U-shaped, spring clip mounted on a portion of said second link spaced from the telescoping portions of said links.

References Cited in the file of this patent

UNITED STATES PATENTS

| | | |
|---|---|---|
| 398,257 | Higham | Feb. 19, 1889 |
| 893,220 | Anderson | July 14, 1908 |
| 1,462,832 | Connell et al. | July 24, 1923 |
| 1,552,886 | Shultz | Sept 8, 1925 |
| 2,162,308 | Jenny | June 13, 1939 |
| 2,177,564 | Havill | Oct. 24, 1939 |
| 2,301,879 | Jenny | Nov. 10, 1942 |
| 2,540,193 | Eckman | Feb. 6, 1951 |
| 2,652,066 | Bowditch | Sept. 15, 1953 |
| 2,915,079 | Harrison | Dec. 1, 1959 |
| 2,925,733 | Huston | Feb. 23, 1960 |